(12) United States Patent
Lautenbach et al.

(10) Patent No.: US 7,909,892 B2
(45) Date of Patent: Mar. 22, 2011

(54) AQUEOUS DYE SOLUTIONS

(75) Inventors: Holger Lautenbach, Grenzach-Wyhlen (DE); Adolf Käser, Bottmingen (DE); Michael Heneghan, Rheinfelden-Eichsel (DE)

(73) Assignee: BASF SE, Ludwigshafen (DE)

( * ) Notice: Subject to any disclaimer, the term of this patent is extended or adjusted under 35 U.S.C. 154(b) by 922 days.

(21) Appl. No.: 10/502,697

(22) PCT Filed: Jan. 21, 2003

(86) PCT No.: PCT/EP03/00540
§ 371 (c)(1), (2), (4) Date: Jul. 26, 2004

(87) PCT Pub. No.: WO03/064539
PCT Pub. Date: Aug. 7, 2003

(65) Prior Publication Data
US 2005/0071932 A1  Apr. 7, 2005

(30) Foreign Application Priority Data
Jan. 28, 2002 (EP) .................. 02405049

(51) Int. Cl.
*C09B 62/008* (2006.01)
*C09B 62/028* (2006.01)
*C09B 62/245* (2006.01)
*C09B 62/35* (2006.01)

(52) U.S. Cl. ............ 8/684; 8/639; 8/641; 8/662; 8/668; 8/670; 8/673; 8/680; 8/681; 8/682; 8/683; 8/690; 8/691; 8/693; 8/619; 8/919

(58) Field of Classification Search .............. 8/662, 648, 8/639, 641, 668, 670, 673, 680, 681, 682, 8/683, 684, 690, 691, 693
See application file for complete search history.

(56) References Cited

U.S. PATENT DOCUMENTS

| | | | | |
|---|---|---|---|---|
| 3,862,116 A | | 1/1975 | Toji | 260/154 |
| 4,058,517 A | | 11/1977 | Bermes | 260/155 |
| 4,877,412 A | | 10/1989 | Pedrazzi | 8/437 |
| 4,995,885 A | | 2/1991 | Morawietz | 8/527 |
| 5,143,519 A | | 9/1992 | Stingelin | 8/527 |
| 5,149,138 A | * | 9/1992 | Zemsky | 283/70 |
| 5,173,086 A | * | 12/1992 | Bermes | 8/527 |

FOREIGN PATENT DOCUMENTS

| | | | |
|---|---|---|---|
| GB | 1593859 | * | 7/1981 |
| WO | 98/49014 | * | 11/1998 |

OTHER PUBLICATIONS

H.A. Lubs, ed., Robert E. Krieger Publishing Co. (1955) "The Chemistry of Synthetic Dyes and Pigments" pp. 97-101.

* cited by examiner

Primary Examiner — Lorna M Douyon
Assistant Examiner — Amina Khan
(74) Attorney, Agent, or Firm — Shiela A. Loggins

(57) ABSTRACT

The present invention relates storage stable aqueous dye solutions comprising
a) 5 to 30% by weight of a dye of the formula

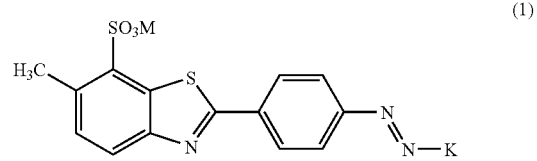

(1)

in which K is a residue of a coupling component of the acetoacetanilide, pyridone, pyrazolone or pyrimidine series and M is hydrogen, an alkali metal or alkaline earth metal, ammonium or alkyl ammonium,
b) 0.05 to 5% by weight of one or more compounds of the formula

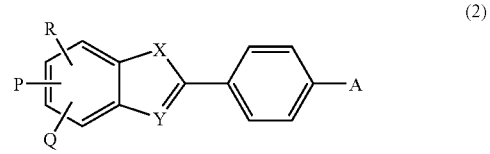

(2)

or a residue of the formula

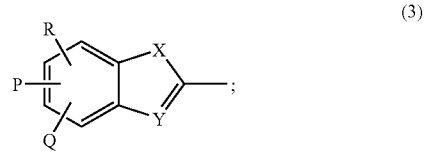

(3)

in which
A, X, Y, R, P and Q are defined herein,
c) an organic or an inorganic base or mixtures thereof,
d) if desired, further additives and
e) water,
a process for their preparation and the use thereof for the dyeing, in particular of paper.

13 Claims, No Drawings

AQUEOUS DYE SOLUTIONS

The present invention relates to storage stable aqueous dye solutions, a process for their preparation and the use thereof for the dyeing, in particular of paper.

It is well known that aqueous formulations of azo-dyes based on 2-(4-aminophenyl)-6-methyl benzothiazole-7-sulphonic acid exhibit a tendency towards liquid crystal formation. This phenomenon is particularly pronounced in the case of C.I. Direct Yellow 147 and increases with increasing purity of the dye. This liquid crystal formation results in an undesirable instability of aqueous formulations due to the occurrence of sedimentation upon storage.

Various attempts to overcome this problem have been described.

Thus, for example, U.S. Pat. No. 4,995,885 discloses concentrated aqueous dye formulations containing between 1 and 5 moles of either 3-diethylamino-1-propylamine, 2-diethylamino-ethanol or 2-(2-aminoethoxy)ethanol per mole of dye, whilst U.S. Pat. No. 5,143,519 discloses the use of 3-diethylamino-1-propylamine together with a hydroxyalkylamine to achieve similar results.

Such formulations, however, are disadvantageous in that comparatively large quantities of expensive amines are required which amines may also be undesirable from an ecological point of view.

Surprisingly, it has now been found that storage stable liquid formulations of such dyes may be obtained by the addition of minor amounts of certain heterocyclic compounds, thus obviating, or considerably reducing, the necessity for employment of such undesirable amines.

Accordingly, the present invention relates to an aqueous dye solution, comprising
a) 5 to 30% by weight of a dye of the formula

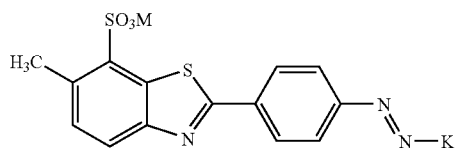

(1)

in which K is a residue of a coupling component of the acetoacetanilide, pyridone, pyrazolone or pyrimidine series and M is hydrogen, an alkali metal or alkaline earth metal, ammonium or alkyl ammonium,
b) 0.05 to 5% by weight of one or more compounds of the formula

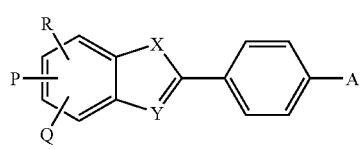

(2)

in which
A represents $-NR_1R_2$, $-NHCOR_1$, $-CN$, halogen, $-NO_2$, $-OH$, $-OR_1$, hydrogen, $C_1$-$C_4$alkyl, $C_2$-$C_4$alkenyl, $C_2$-$C_4$alkinyl, $-CO_2M$, $-CO_2R_1$ or $-CONR_1R_2$, wherein $R_1$ and $R_2$ each, independently of one another, represent hydrogen or $C_1$-$C_4$alkyl and M is as previously defined, or a residue of the formula

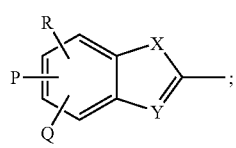

(3)

X represents O, S or $NR_1$, $R_1$ being as previously defined;
Y represents N or $CR_1$, $R_1$ being as previously defined and
P, Q and R each, independently of one another, represent hydrogen, $C_1$-$C_4$alkyl, $-SO_3M$, $-PO_3M$, $-CO_2M$, $-OH$, $-NO_2$ or $-COR_1$, M and $R_1$ being as previously defined, c) an organic or an inorganic base or mixtures thereof,
d) if desired, further additives and
e) water.

Preferably K is a residue of a coupling component of the formula

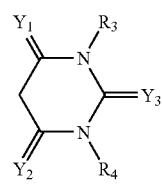

(4)

in which
$Y_1$ and $Y_2$ independently of one another are $=O$, $=NH$ or $=N-C_1$-$C_4$alkyl, preferably being $=O$ or $=NH$ and being identical to each other,
$Y_3$ is $=O$, $=S$, $=NH$, $=N-C_1$-$C_4$alkyl or $=N-CN$, especially $=O$, $=NH$ or $=N-CN$ and
$R_3$ and $R_4$ independently of one another are each hydrogen, substituted or unsubstituted $C_1$-$C_6$alkyl or substituted or unsubstituted phenyl.

The above formula (4), although showing only one of the tautomeric forms of the coupling component, shall be taken to encompass all the tautomeric forms as well.

Most preferably, the dye of formula (1) is C.I. Direct Yellow 137, C.I. Direct Yellow 147 or C.I. Direct Yellow 166 and the solutions preferably contain from between 10 to 20% by weight of dye.

The aqueous dye solutions of the invention preferably comprise, as component b), one or more compounds of formula (2) in which
A represents $-NH_2$, $-OH$, halogen or the residue of formula (3),
X represents oxygen or sulphur,
Y is a nitrogen atom and
P, Q and R, independently of one another, are each hydrogen, $C_1$-$C_4$alkyl or $SO_3M$,
M being as defined previously.

Especially preferred aqueous dye solutions are those comprising, as component b), one or more compounds of formula

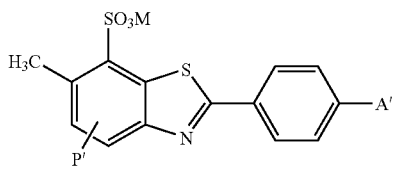

in which

A' represents —NH$_2$, —OH, Br or a residue of the formula

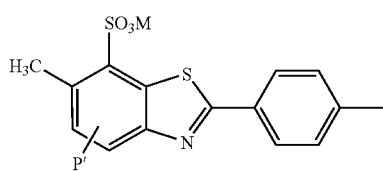

and

P' represents hydrogen or SO$_3$M,

M being as defined previously.

The component or components b) of the aqueous dye formulation are present, preferably, in a total amount of between 0.1 and 2%, especially between 0.1 and 0.5% by weight of the composition.

The organic or an inorganic base or their admixtures, component c) of the formulation of the invention, is preferably selected from the group consisting of lithium, potassium or sodium hydroxides, ammonia, mono-, di- or tri-C$_1$-C$_4$alkylamines, mono-, di- or tri-C$_2$-C$_4$hydroxyalkylamines or mono-, di- or tri-C$_2$-C$_4$hydroxyalkyl-C$_1$-C$_4$alkylamines, especially useful examples of which are di- and tripropylamines or di- and tributylamines, di- and triethanolamines, mono-, di- and tripropanolamines and N-methylamino and N-ethylamino ethanols or propanols, whilst mixtures of lithium hydroxide and triethanolamine or N-methyl ethanolamine are especially preferred. The base is present in a total amount of between 1 and 5 moles, preferably between 1 and 2 moles and most especially, in approximately equimolar amounts, per mole of dye in the form of the free sulphonic acid.

The dye solutions according to the invention may, in addition contain further additives such as water-soluble organic solubilizers as component d). Examples of such additives are urea, formamide, ε-caprolactam, dimethylformamide, 1,2-diaminopropane and polyhydric alcohols such as ethylene glycol, propylene glycol or glycerol, urea, ε-caprolactam or polyhydric alcohols being preferred. The amount of such additives employed in the formulation depends upon the amounts of the other components present, and may vary over a range of from 0 to 20%, based on the total weight of the composition, but generally either none or from between 1 and 10% of such additives are present.

Preferred aqueous dye solutions according to the invention comprise a) 5 to 30%, preferably 10 to 20%, by weight of a dye of the formula (1) in which K is derived from a coupling component selected from the formulae

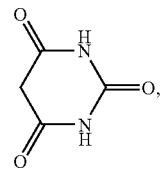

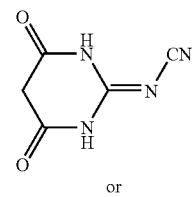

or

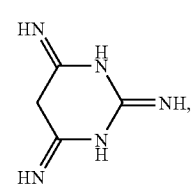

b) 0.05 to 5%, preferably 0.1 to 2% and, most preferably, 0.1 to 0.5% by weight of one or more compounds of the formula (5), c) 1 to 5 moles, preferably, 1 to 2 moles per mole of dye, in the form of the free sulphonic acid, of a base selected from the group consisting of lithium, potassium or sodium hydroxides, ammonia, mono-, di- or tri-C$_1$-C$_4$alkylamines, mono-, di- or tri-C$_2$-C$_4$hydroxyalkylamines or mono-, di- or tri-C$_2$-C$_4$hydroxyalkyl-C$_1$-C$_4$alkylamines or mixtures thereof, d) 0 to 20% by weight of further additives and e) water, making up to a total of 100% of the aqueous dye solution.

Within the scope of the above formulae (2) and (3), C$_1$-C$_4$alkyl is, for example, methyl, ethyl, n-propyl, isopropyl, n-butyl, sec-butyl or tert-butyl, whilst, C$_2$-C$_4$alkenyl is, for example, ethenyl, propenyl or butenyl and C$_2$-C$_4$alkinyl may be ethynyl, propynyl or butynyl. Halogen may be fluorine, chlorine, bromine or iodine, chlorine and, especially, bromine being preferred.

Where, in above formula (4), R$_3$ and R$_4$ are substituted or unsubstituted C$_1$-C$_6$alkyl, these are, for example, methyl, ethyl, n-propyl, isopropyl, n-butyl, sec-butyl or tert-butyl, straight-chain or branched pentyl or hexyl, or cyclohexyl, which may each be monosubstituted or polysubstituted, for example, by hydroxy, C$_1$-C$_4$alkoxy or C$_1$-C$_4$hydroxyalkoxy.

Examples of suitably substituted alkyl are: methoxymethyl, ethoxymethyl, ethoxyethyl, ethoxypropyl, n-propoxymethyl, isopropoxymethyl, butoxymethyl, butoxyethyl, butoxypropyl, ethoxypropyl, methoxybutyl, ethoxypentyl and 2-hydroxyethoxypentyl.

Substituted or unsubstituted phenyl R$_3$ and R$_4$ can be, for example, phenyl itself or phenyl which is monosubstituted or polysubstituted by identical or different radicals.

Examples of such radicals are: methyl, ethyl, n-propyl, isopropyl, n-butyl, sec-butyl, tert-butyl, methoxy, ethoxy n-propoxy, isopropoxy, n-butoxy, sec-butoxy, tert-butoxy, halogen such as fluorine, chlorine or bromine or nitro.

Preferably R$_3$ and R$_4$ are unsubstituted phenyl.

The definition of M, in any of the above formulae, depends, to a certain extent, upon which base is used as component c) of the formulation.

However, preferably M is hydrogen, lithium, potassium or sodium, ammonium mono-, di- or tri-$C_1$-$C_4$alkylammonium, mono-, di- or tri-$C_2$-$C_4$hydroxyalkylammonium or mono-, di- or tri-$C_2$-$C_4$hydroxyalkyl-$C_1$-$C_4$alkylammonium, whereby $C_1$-$C_4$alkyl is as previously defined. $C_2$-$C_4$hydroxyalkyl, both as defined for M and also within the scope of the definition of the base component c), may, for example, be hydroxyethyl, hydroxypropyl or hydroxybutyl.

The dyes of formula (1) and the heterocyclic compounds of formula (2) are known compounds or may be prepared by known methods.

The aqueous dye solutions according to the invention are, in general, prepared by stirring the free dye acids of formula 1 with a mixture of water, one or more compounds of formula (2), and, if desired, further additives, until a homogeneous solution has been formed. If necessary, the mixture can be heated, for example to 40-60° C., and possibly filtered.

The aqueous dye solutions obtained according to the invention are notable, in particular, for a long shelf life, exhibiting neither sedimentation nor an increase in viscosity on storage.

The aqueous dye solutions obtained according to the invention are used as they are or after dilution with water, particularly for dyeing and printing paper, including paperboard and cardboard, the dyeing of these materials being effected, for example, in the mass, by coating or by dipping.

The following Examples illustrate the invention without intending to be restrictive in nature. Parts and percentages are by weight unless otherwise stated.

EXAMPLE 1

A suspension consisting of 132 g of the dye of the formula

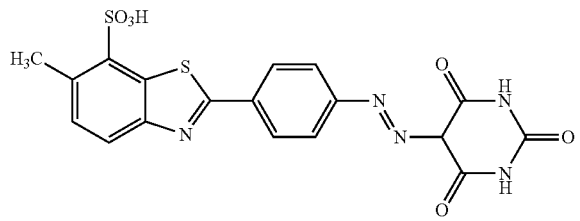

which has previously been washed with hydrochloric acid, in 600 g of salt-free water is treated with 120 g of a mixture containing 5.4% lithium hydroxide and 28% triethanolamine in water. Following dissolution, the mixture is treated with 2.5 g of 2-(4-aminophenyl)-6-methyl benzothiazole-7-sulphonic acid and, with efficient stirring, diluted to 1000 g with water. The resulting solution exhibits no sign of turbidity after cooling to 4° C. and is stable after a period of 6 months storage at this temperature. Furthermore, the temperature-dependent viscosity curve indicates no sign of an increase in viscosity down to 3° C.

However, a corresponding formulation not containing 2-(4-aminophenyl)-6-methyl benzothiazole-7-sulphonic acid already exhibits turbidity at temperatures below 15° C., whilst the temperature-dependent viscosity curve indicates a clear change in viscosity with temperature.

EXAMPLE 2

Following the procedure described in Example 1, but replacing the 2.5 g of 2-(4-aminophenyl)-6-methyl benzothiazole-7-sulphonic acid by 5.0.5 g of 2-(4-bromophenyl)-6-methyl benzothiazole-7-sulphonic acid, a solution of the dye is obtained which exhibits no sign of turbidity after cooling to 4° C. and remains stable after storing for a period of 1 month at room temperature.

The invention claimed is:
1. An aqueous dye solution, comprising
a) 5 to 30% by weight of a dye of formula (1)

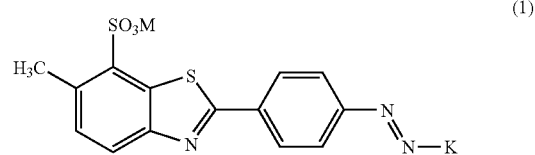

in which
K is a residue of a coupling component of the acetoacetanilide, pyridone, pyrazolone or pyrimidine series and
M is hydrogen, an alkali metal or alkaline earth metal, ammonium or alkylammonium,
b) 0.05 to 5% by weight of one or more compounds of formula (2)

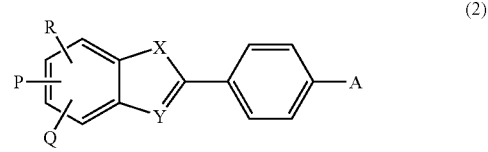

in which
A represents —$NR_1R_2$, —$NHCOR_1$, —CN, halogen, —$NO_2$, —OH, —$OR_1$, hydrogen, $C_1$-$C_4$alkyl, $C_2$-$C_4$alkenyl, $C_2$-$C_4$alkinyl, —$CO_2M$, —$CO_2R_1R_2$, or —$CONR_1$, $R_2$, wherein
M is as previously defined, and $R_1$ and $R_2$ each, independently of one another, represent hydrogen or $C_1$-$C_4$alkyl provided that A is not represented by —$NH_2$,
or A is a residue of formula (3)

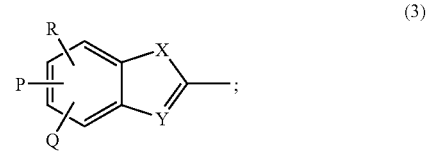

X represents O, S or $NR_1$, $R_1$ being as previously defined;
Y represents N or $CR_1$, $R_1$ being as previously defined and
P, Q and R each, independently of one another, represent hydrogen, $C_1$-$C_4$alkyl, —$SO_3M$, —$PO_3M$, —$CO_2M$, —OH, —$NO_2$ or —$COR_1$, M and $R_1$ being as previously defined,
c) an organic or an inorganic base or mixtures thereof,
d) optionally, further additives and
e) water.
2. The aqueous dye solution according to claim 1, wherein A represents —OH, halogen or the residue of formula (3); X represents oxygen or sulfur;
Y is a nitrogen atom; and
P, Q, and R independently of one another are each hydrogen, $C_1$-$C_4$alkyl, or $SO_3M$, M being as defined in claim 1.

3. The aqueous dye solution according to claim 1, wherein the coupling component from which K is derived is a compound of formula (4)

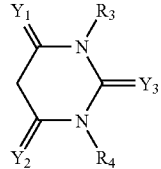
(4)

wherein
$Y_1$ and $Y_2$ are independently of one another =O, =NH, or =N—$C_1$-$C_4$alkyl;
$Y_3$ is =O, =S, =NH, =N—$C_1$-$C_4$alkyl, or =N—CN; and
$R_3$ and $R_4$, independently of one another, are each hydrogen, substituted or unsubstituted $C_1$-$C_6$alkyl, or substituted or unsubstituted phenyl.

4. The aqueous dye solution of claim 1, wherein the dye of formula (1) comprises 10 to 20% of the aqueous dye solution.

5. The aqueous dye solution of claim 1, wherein, in the one or more compounds of formula (2)
A represents —OH, halogen, or the residue of formula (3);
X represents oxygen or sulfur;
Y is a nitrogen atom; and
P, Q, and R, independently of one another, are each hydrogen, $C_1$-$C_4$alkyl, or $SO_3M$,
M being as defined in claim 1.

6. The aqueous dye solution of claim 5, wherein the one or more compounds of the formula (2) are one or more compounds of formula (5)

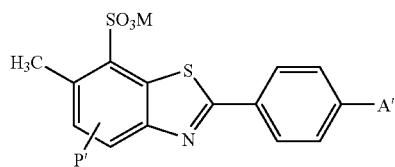
(5)

wherein
A' represents —OH or Br;
P' is hydrogen or $SO_3M$; and
M is as defined in claim 5.

7. The aqueous dye solution of claim 1, wherein the one or more compounds of formula (2) comprise 0.1 to 2% by weight of the aqueous dye solution.

8. The aqueous dye solution of claim 1, wherein the organic or inorganic base is selected from the group consisting of lithium hydroxide, potassium hydroxide, sodium hydroxide, ammonia, mono-, di-, or tri-$C_1$-$C_4$alkylamines, mono-, di-, or tri-$C_2$-$C_4$hydroxyalkylamines, mono-, di- or tri-$C_2$-$C_4$hydroxyalkyl-$C_1$-$C_4$alkylamines, and mixtures thereof.

9. The aqueous dye solution of claim 1, wherein the further additives are urea, ε-caprolactam, or a polyhydric alcohol.

10. The aqueous dye solution of claim 1, wherein K is derived from a coupling component of formula

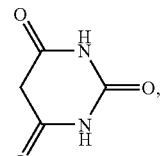
(7)

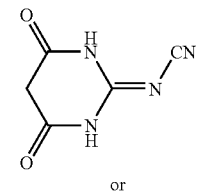
(8)

or

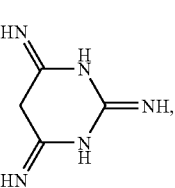
(9)

the one or more compounds of formula (2) are one or more compounds according to formula (5)

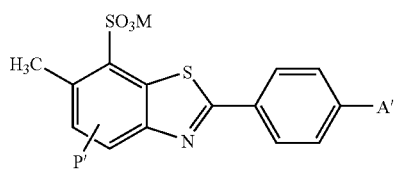
(5)

the organic or inorganic base is selected from the group consisting of lithium hydroxide, potassium hydroxide, sodium hydroxide, ammonia, mono-, di-, or tri-$C_1$-$C_4$alkylamines, mono-, di-, or tri-$C_2$-$C_4$hydroxyalkylamines, mono-, di- or tri-$C_2$-$C_4$hydroxyalkyl-$C_1$-$C_4$alkylamines, and mixtures thereof;
wherein
A' represents —OH or Br;
P' is hydrogen or $SO_3M$; and
M is as defined in claim 1.

11. A process for the preparation of the aqueous dye solution of claim 1 comprising stirring a dye of formula 1, as defined in claim 1, with a mixture of water, one or more compounds of formula (2) as defined in claim 1, an organic or inorganic base or mixtures thereof, and, optionally, further additives.

12. A method for dyeing paper, said method comprising coating or dipping paper into the aqueous dye solution of claim 1.

13. A paper that has been dyed with the aqueous dye solution of claim 1.

* * * * *